United States Patent
Buslepp et al.

(10) Patent No.: US 8,301,362 B2
(45) Date of Patent: Oct. 30, 2012

(54) METHOD AND SYSTEM FOR GENERATING A DIAGNOSTIC SIGNAL OF AN ENGINE COMPONENT USING AN IN-CYLINDER PRESSURE SENSOR

(75) Inventors: Kenneth J. Buslepp, Brighton, MI (US); Douglas R. Verner, Sterling Heights, MI (US); Joseph R. Dulzo, Novi, MI (US); Jonathan T. Shibata, Milan, MI (US); Daniel G. Brennan, Brighton, MI (US); Joshua Cowgill, Brighton, MI (US)

(73) Assignee: GM Global Technology Operations LLC

(*) Notice: Subject to any disclaimer, the term of this patent is extended or adjusted under 35 U.S.C. 154(b) by 887 days.

(21) Appl. No.: 12/412,756

(22) Filed: Mar. 27, 2009

(65) Prior Publication Data

US 2010/0250089 A1 Sep. 30, 2010

(51) Int. Cl.
*F02M 7/00* (2006.01)
*G06F 19/00* (2011.01)

(52) U.S. Cl. ........................................ 701/114; 123/435
(58) Field of Classification Search .................. 701/102, 701/114; 123/435, 494; 73/35.12, 114.16, 73/114.17, 114.38
See application file for complete search history.

(56) References Cited

U.S. PATENT DOCUMENTS

| 5,168,854 | A | * | 12/1992 | Hashimoto et al. | ...... 123/406.17 |
| 5,554,801 | A | * | 9/1996 | Watanabe | .................. 73/114.16 |
| 5,703,285 | A | * | 12/1997 | Shimizu et al. | ............ 73/114.74 |
| 6,598,468 | B2 | * | 7/2003 | Zur Loye et al. | .......... 73/114.06 |
| 7,124,017 | B2 | * | 10/2006 | Kassner | ........................ 701/114 |
| 2003/0010101 | A1 | * | 1/2003 | Zur Loye et al. | ............... 73/116 |
| 2004/0193361 | A1 | * | 9/2004 | Kassner | ........................ 701/114 |
| 2005/0159877 | A1 | * | 7/2005 | Hattori | ........................ 701/107 |

* cited by examiner

Primary Examiner — Mahmoud Gimie

(57) ABSTRACT

A method and a control module for diagnosing an engine component function includes a comparison module comparing an in-cylinder pressure signal to a threshold and a fault indication module generating a diagnostic signal for an engine component in response to comparing.

19 Claims, 12 Drawing Sheets

METHOD AND SYSTEM FOR GENERATING A DIAGNOSTIC SIGNAL OF AN ENGINE COMPONENT USING AN IN-CYLINDER PRESSURE SENSOR

FIELD

The present disclosure relates generally to a method and system for controlling an engine, and, more specifically to a method and system for using in-cylinder pressure sensors for indirectly determining engine hardware operating conditions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Determining the successful operation of various hardware associated with the engine typically requires several sensors for determining the states of the various types of hardware. Providing separate sensors for each of the different parts of the engine increases the overall cost of the engine and, therefore, increases the cost of the vehicle. Automobile manufacturers are under increased pressure to reduce costs while providing a reliable vehicle.

SUMMARY

The present disclosure provides a system and method for generating the diagnostic signal for various hardware associated with the engine using in-cylinder pressure sensors.

In one aspect of the disclosure, a method includes generating an in-cylinder pressure signal for an engine, comparing the in-cylinder pressure signal to a threshold and generating a diagnostic signal for an engine component in response to comparing.

In another aspect of the disclosure, a control module includes a comparison module comparing an in-cylinder pressure signal to a threshold and a fault indication module generating a diagnostic signal for an engine component in response to comparing.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
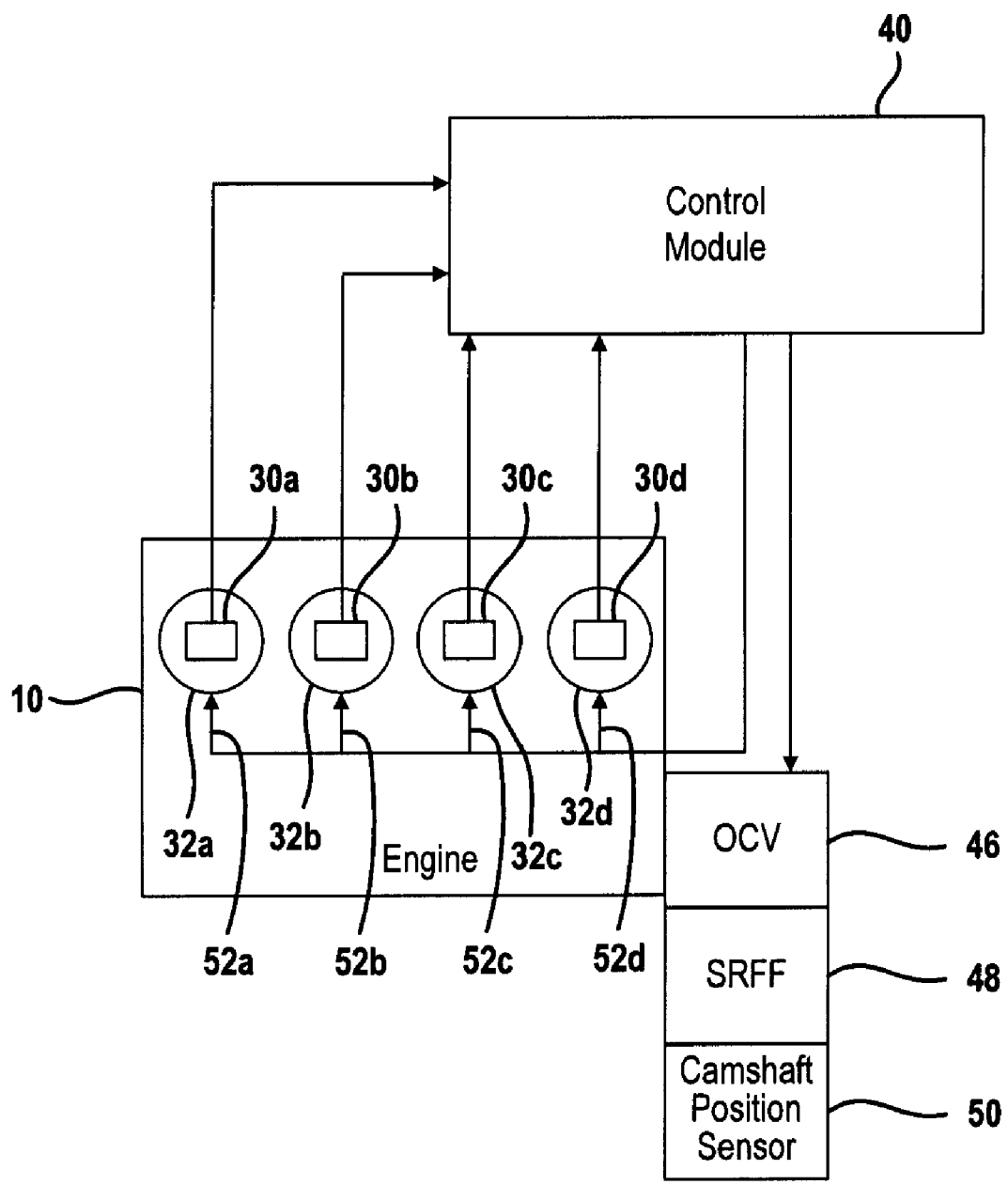
FIG. 1 is a block diagrammatic view of the control system of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine 10 may include in-cylinder pressure sensors 30A, 30B, 30C and 30D in respective cylinders 32A-32D. Each in-cylinder pressure sensor 30A-30D generates an in-cylinder pressure signal that is communicated to a control module 40. The control module 40 may be an engine control module. Although only four cylinders 30A-30D are shown, the engine may include many different amounts of cylinders and corresponding pressure sensors.

The engine 10 may be a variable valve timing engine that includes an oil control valve 46 used to control switchable roller finger followers 48. Of course, the present disclosure may apply to various other types of engines.

The control module 40 may include a controller for the oil control valve 46 that is used to control the flow of oil that is used to control the switchable roller finger followers 48. The oil control valve 46, if not operating properly, may be evident in the cylinder pressures of two cylinders. The switchable roller finger follower 48 may also individually fail in the in-cylinder pressure outputs as will be described below.

A camshaft position sensor 50 may also provide a signal to the control module 40. In the following disclosure, the operation of the camshaft position sensor or the failure thereof may be diagnosed. The camshaft position sensor indicates a position and thus the expected valve position for valves 52a-52d. When the valves 52a-52d are operating properly as indicated by the in-cylinder pressure, a fault in the camshaft position sensor 50 may be determined.

The control module 40 thus indirectly controls the operation of valves 52a, 52b, 52c and 52d and can determine the stability of operation thereof. Although only one valve is illustrated for simplicity, each cylinder includes at least one intake valve and at least one exhaust valve. Multiple intake and exhaust valves may also be provided within the engine.

The control module 40 may determine if spark is enabled for each cylinder, whether an injector fault or ignition coil fault is present and the expected position of the piston within the cylinder. The control module 40 may manage the torque of the engine and generate pressure-volume curves corresponding to the operation of the engine.

Figure 2:
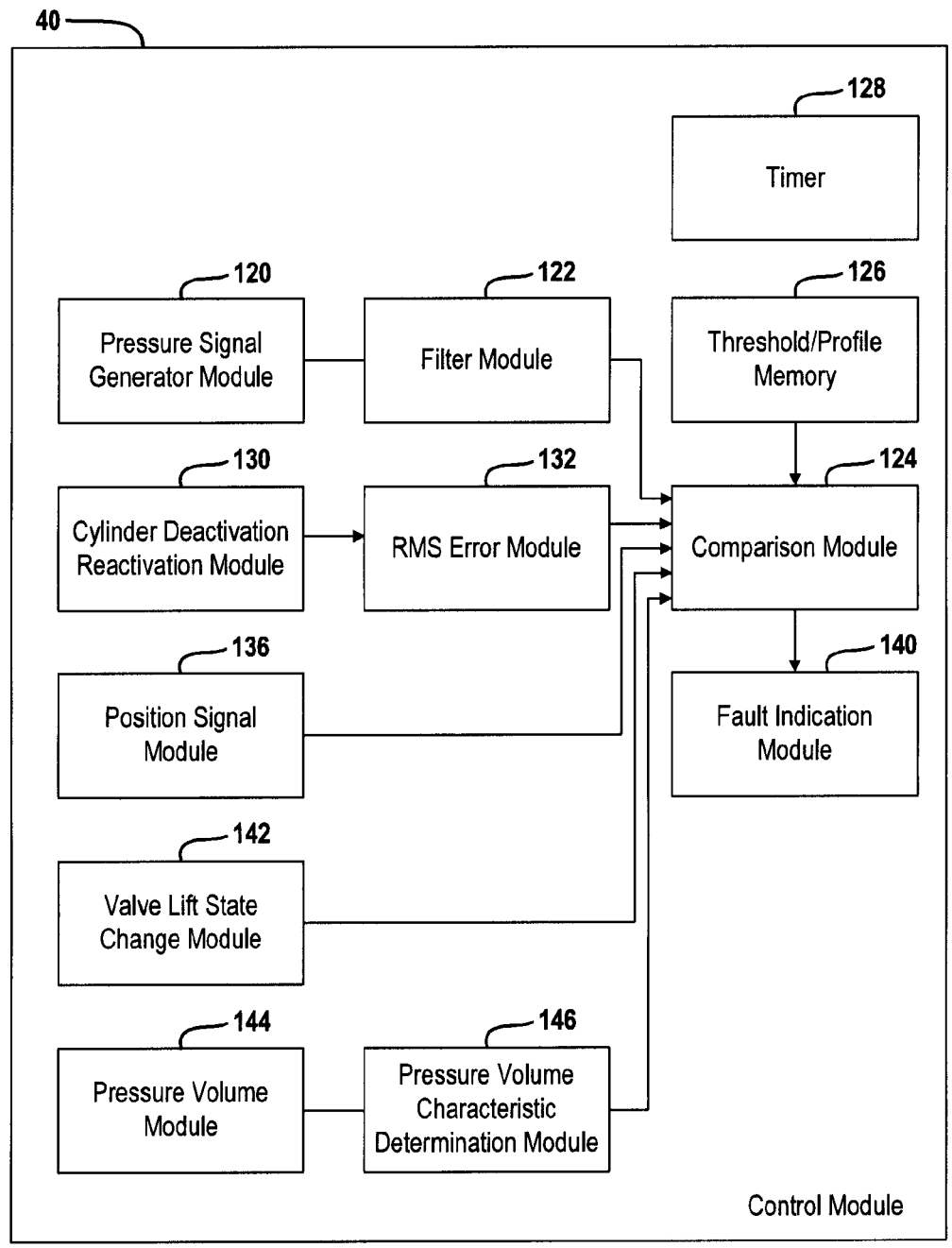
FIG. 2 is a block diagrammatic view of a control module according to the present disclosure.

Referring now to FIG. 2, the control module 40 of FIG. 1 is illustrated in further detail. The control module 120 may include a pressure signal generator module 120. Each of the pressure sensors 30A-30D may be used to generate a pressure signal. The pressure signal generator module 120 may receive the pressure signals from the pressure sensors and convert them into a form usable by the rest of the control module. As will be described below, each of the pressure signals from each of the cylinders may be used.

A filter module 122 is used to filter the pressure signals from the pressure signal generator. Various types of filters may be used. For example, a single pass filter that adds phase shift may be used. Another type of filter is a forward backward filter that adds no phase shift. A double-pass filter that adds no phase shift may also be used. The filtering process adds a delay to the signal, which depends on the order of the signal. The cut-off frequency may be set to maintain a level of detection while rejecting high frequency noise in the pressure signals due to mechanical or electrical sources. The corner frequency of the filter may be changed with engine speed to provide the best noise reduction.

A comparison module 124 may also be provided within the control module 40. The comparison module 124 may perform the various comparisons between the pressure signals or derivations of pressure signals. The thresholds and profiles in a memory 126 may also be used by the comparison module.

The comparison module 124 may compare the measured pressure sensor signal with a threshold to determine whether or not the intake or exhaust valves are closing and if the operation of the valves have been stable for a predetermined period. The comparison module 124 may also determine whether or not the valves in the engine have been deactivated or reactivated during cylinder deactivation. The comparison module 124 may also be used to determine whether the camshaft position sensor is operating properly in response to the cylinder pressure. The comparison module 124 may compare a coefficient of variation to determine whether the valves have transitioned properly. The comparison module 124 may also compare the slopes or integrals of a pressure-volume curve to determine whether the oil control valve or the switchable roller finger followers are operating properly within the engine.

The control module 40 may also include a timer 128 for measuring times between various events or timing various events. The timer 128 may also time relative times between various events.

For the cylinder deactivation/reactivation determination, a cylinder deactivation/reactivation module 130 controls the cylinder deactivation and reactivation within the engine 10. The root mean square module (RMS) 132 determines the root mean square error between the acquired pressure signals and a reference pressure signal. The reference pressure signal may be stored within the memory 126. The comparison of the root mean square error between the acquired pressure sample and the reference pressure sample may take place in the comparison module 124.

In determining a camshaft position error, a camshaft position signal module 136 may determine the camshaft position signal and provide the camshaft position signal to the comparison module 124. The camshaft position module 136 may provide a signal corresponding to the expected position of the cylinder. The comparison module 124 in this case may compare the in-cylinder pressure with a minimum combustion pressure to determine if combustion is taking place. This is performed relative to the crankshaft position. When no combustion takes place when combustion is expected, a fault may be indicated by a fault indication module 140. Other conditions also generate a fault in the fault indication module 140. The fault indication module 140 generates a diagnostic signal corresponding to a fault of a component as determined in the comparison.

A valve lift state module 142 may be used to control the valve lift state changes at the valve lift module. The valve lift state change module 142 may provide an indication that the valves have changed lift state to the comparison module 124. The in-cylinder pressure signal from the pressure signal generator module 120 may be provided and compared in the comparison module 124. The comparison module 124 may compare the pressure prior to and after an expected lift state change to determine if the change occurred.

A pressure-volume module 144 may determine a pressure-volume plot for each cylinder. A pressure-volume characteristic determination module 146 may determine a slope or an integral of the pressure-volume characteristic. By comparing the slope or the integral against other pressure-volume characteristics from other cylinders in the comparison module 124, an indication of properly operating valves may be set forth. In particular, if one valve is not operating properly, the switchable roller finger follower may be in error. If two valves are not operating the same as the other valves, then the oil control valve may be faulty. Comparisons between the pressure-volume characteristics may be performed in the comparison module 124 using data from other cylinders while the engine is operating or against thresholds or profiles that are stored in the memory 126.

Figure 3:
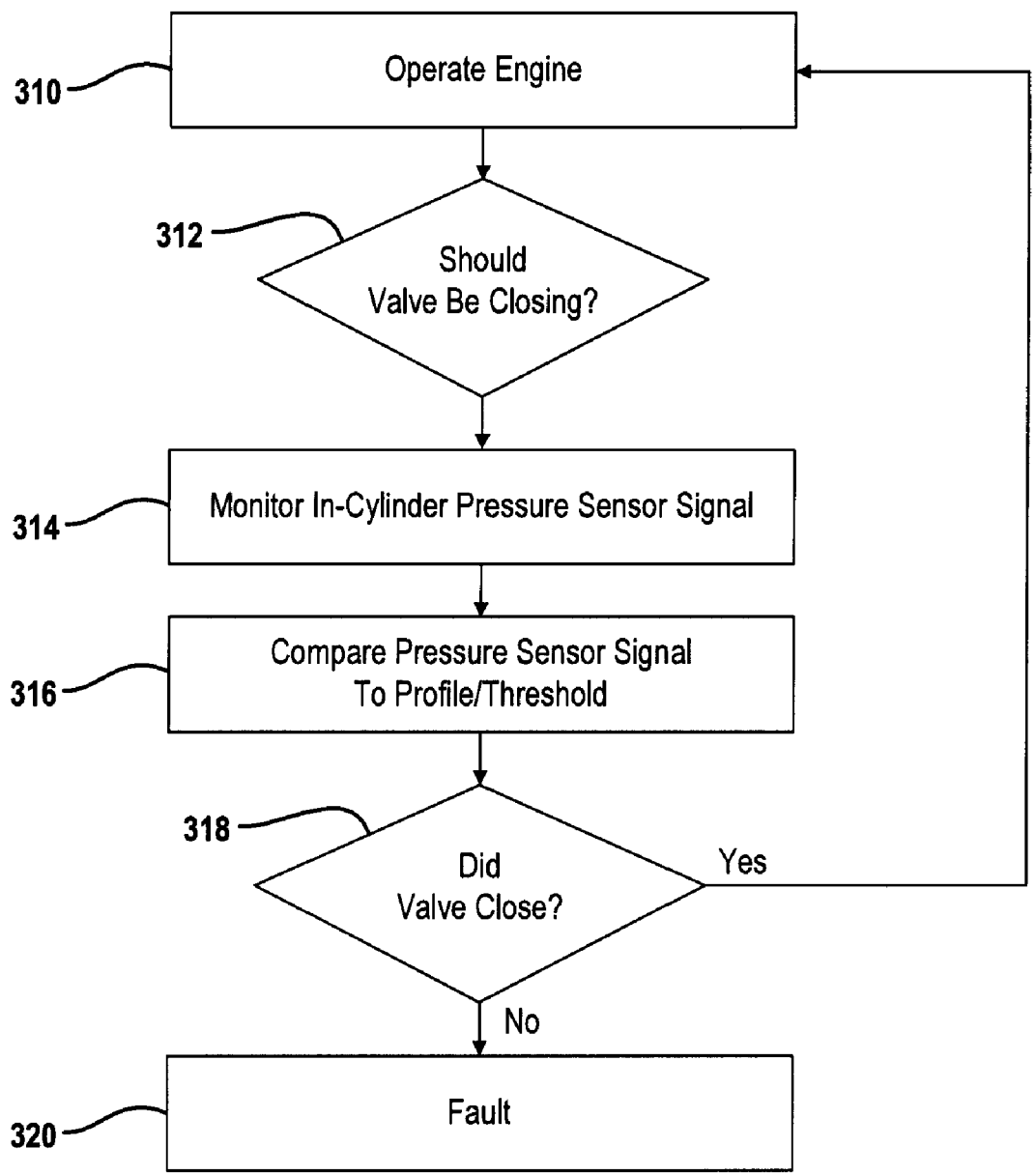
FIG. 3 is a flowchart of a method for determining whether a valve is operating properly.

Referring now to FIG. 3, a method of using the in-cylinder pressure sensors to detect valve closing is set forth. The pressure sensors may include a pin that the input pressure pushes on for the pressure sensor reading. The pin acts like a mass on a spring and will also read vibration. Because the pressure sensors are disposed within the engine block, vibrations within a head of the engine may be sensed.

In step 310, the engine is operated. The engine is operated with the knowledge of whether or not the valve should be closing. This may be determined in various ways including using a sensor camshaft. In step 312, it is determined whether the valves should be closing. That is, the valve timing is monitored. In step 314, the in-cylinder pressure signals are monitored by the control module. In-cylinder pressure sensors generate sensor signals. As mentioned above, the pressure sensor signals may also correspond to vibration in the engine. The vibration may correspond to the closing of intake valves, exhaust valves or both. In step 316, the pressure sensor signal is compared to a profile or threshold. If the amplitude of the pressure signal is above a threshold, the pressure sensor signal may indicate the valve closed. Also, the pressure signal may be compared to a signal profile as the threshold. A filtered pressure signal may also be used. When the pressure signal corresponds to the profile of a properly closing valve, the valve has closed properly. In step 318, the comparison is formed for determining whether the valve has closed. If the valve has closed, as indicated by comparison to a threshold or profile, the engine performs step 310 and another check is performed. Each of the valves for each of the cylinders may be checked.

If the valve did not close properly, step 320 generates a fault indicator for diagnosing the engine component malfunction. The fault indicator may be a check engine light or other type of warning message. The fault may also be an audible indicator, such as a chime or voice.

Figure 4:
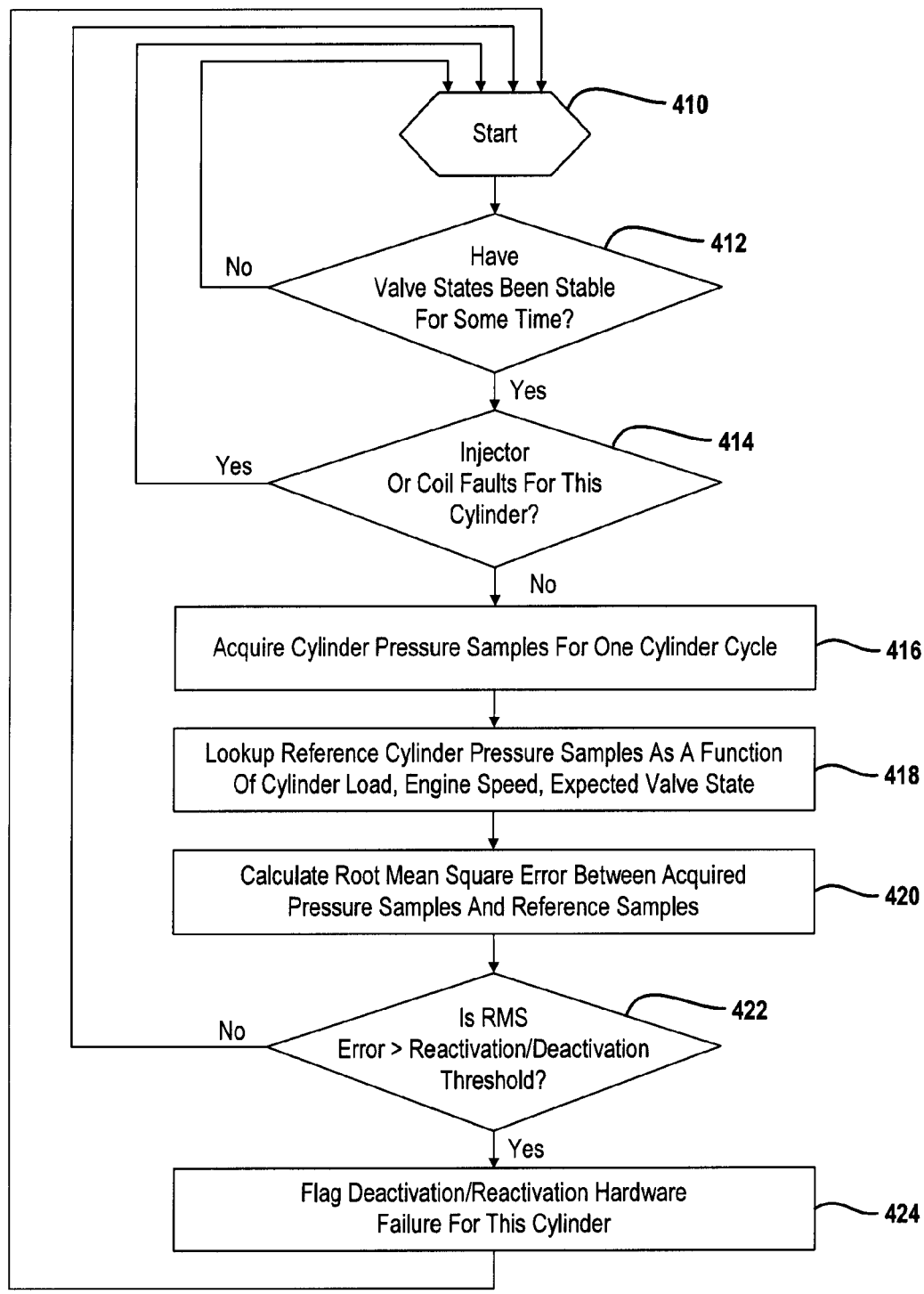
FIG. 4 is a flowchart of a method for determining whether cylinder deactivation or reactivation has taken place.

Referring now to FIG. 4, a method for determining cylinder deactivation and reactivation failures is set forth. In certain engines, cylinders may be deactivated for various reasons. One example of cylinder deactivation is when the vehicle is decelerating, the fuel to the engine may be cut off. This may be referred to as a deceleration fuel cut off. Other conditions for deactivating and reactivating cylinders is during highway driving. Several cylinders may be deactivated since a minimum amount of power is required to maintain the vehicle speed.

The method starts in step 410. Step 412, if the valve states of have been stable for some time as indicated by a timer, step 414 is performed. Step 414 determines if there is any injector or coil faults for the cylinder. If there have been injector or coil faults, the system may be started again at step 410. After step 414, if no injector or ignition coil faults for the cylinder are active, step 416 requires cylinder pressure samples for one cylinder cycle. Step 418 looks up a reference cylinder pressure sample as a function of the cylinder load, engine speed and expected valve state. The cylinder pressure samples may be stored in the memory illustrated in FIG. 2. In step 420, the root mean square error between the acquired pressure samples and reference pressure samples stored within the memory may be performed. In step 422, if the root mean square error is above an activation/deactivation threshold, a flag deactivation/reactivation hardware failure for the particular cylinder may be generated in step 424. Referring back to step 422, if the RMS error is above a deactivation/reactivation threshold, the method continues at the start in step 410.

It should be noted that this check may be used in conjunction with other types of checks set forth in this disclosure.

The emissions and valve train hardware may be susceptible to failures in the cylinder deactivation hardware. The present disclosure determines cylinder deactivation failures. The deactivated valves and push rods should not be subjected to high rotational velocities within the engine. By detecting failures of valves to properly reactivate, engine warranty may be improved by limiting engine operation when cylinder reactivation fails to occur. When the cylinder deactivation/reactivation flag is set, the engine control module may attempt to reactivate the particular cylinder that was not reactivated.

Figure 5:
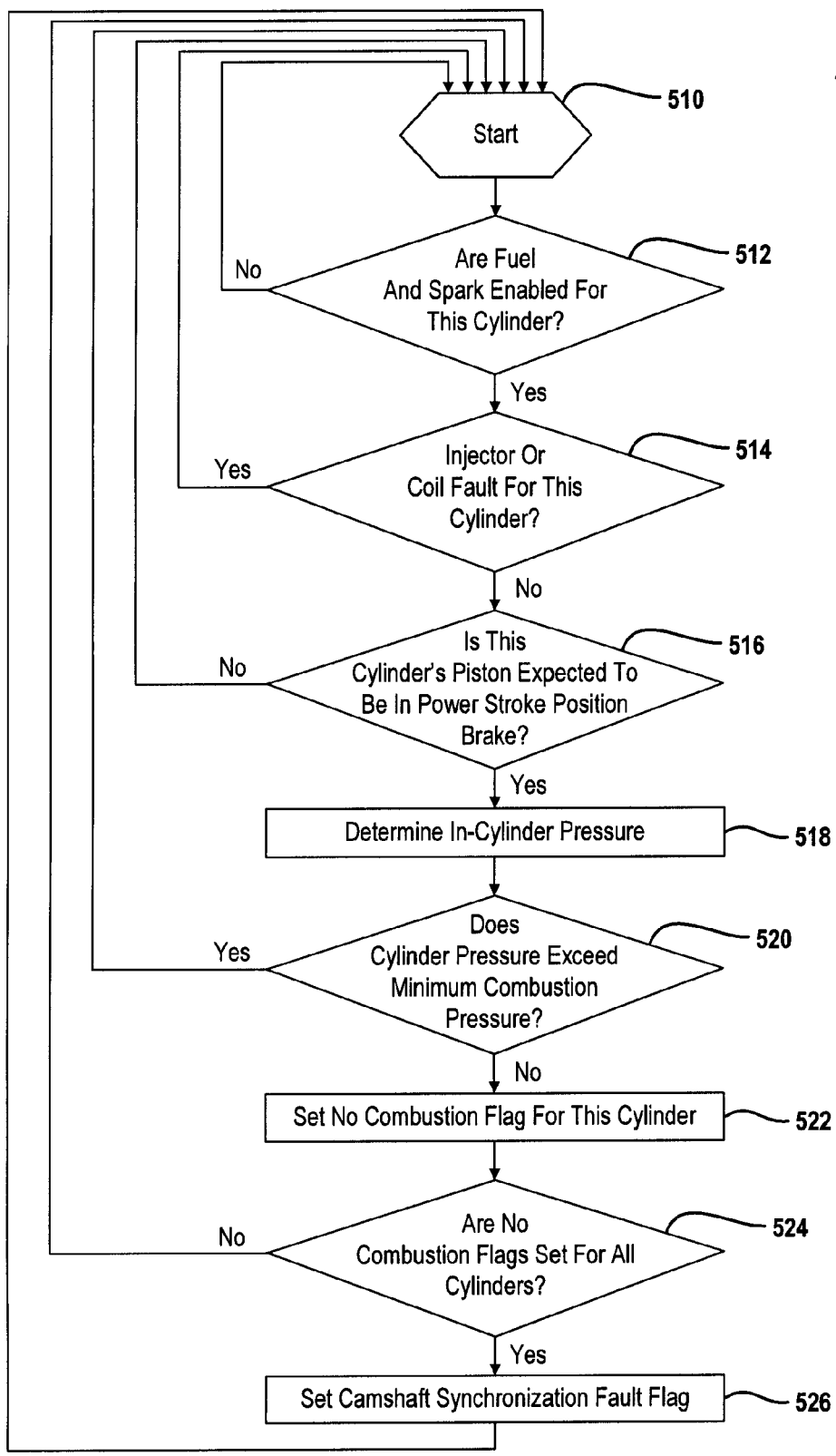
FIG. 5 is a flowchart of a method for indirectly determining a camshaft position failure.

Referring now to FIG. 5, a method for using the in-cylinder pressure to diagnose camshaft position sensor failures is set forth. Camshaft position target wheels are generally encoded such that they can be sampled as high or low depending on whether the cylinder is at top dead center compression or top dead center exhaust. Position sensing can fail which leads to mistimed fueling and spark firing. The cylinder pressure signal may be used to detect errors in the cylinder state.

In step 510, the method for detecting the camshaft state is set forth. In step 512, the system determines whether fuel and spark have been enabled for the particular cylinder. If the fuel and spark has not been enabled, the system starts again in step 510 and proceeds to another system check. In step 512, when the fuel and spark have been enabled, step 514 is performed. In step 514, it is determined whether injector or coil faults have been activated for the cylinder. If injector or coil faults have been activated, step 510 is again performed.

In step 514, when the injector or coil faults for the cylinder have not been activated, step 516 determines whether the cylinder's position is expected to be in a power stroke position range. If the engine is expected to be in a power stroke position range, step 518 determines the in-cylinder pressure from the in-cylinder pressure sensors. Step 520 compares the cylinder pressure with a minimum combustion pressure. The minimum combustion pressure may be stored as a threshold or profile in the memory of the control module. When the cylinder pressure does exceed a minimum combustion pressure, this is indicative of a properly operating cylinder and the process starts again in step 510 or starts another check process as set forth in the disclosure. When the cylinder pressure does not exceed a minimum combustion pressure in step 520, step 522 sets a no-combustion flag or other fault for the particular cylinder. In step 524, if no combustion flags are set for all the cylinders, the system proceeds again in step 510. If no combustion flags are set for all the cylinders in step 522, step 526 sets a camshaft synchronization fault flag. A diagnosis signal corresponding to the fault may be communicated to the vehicle operator in various ways including an indicator light or audible noise.

Figure 6:
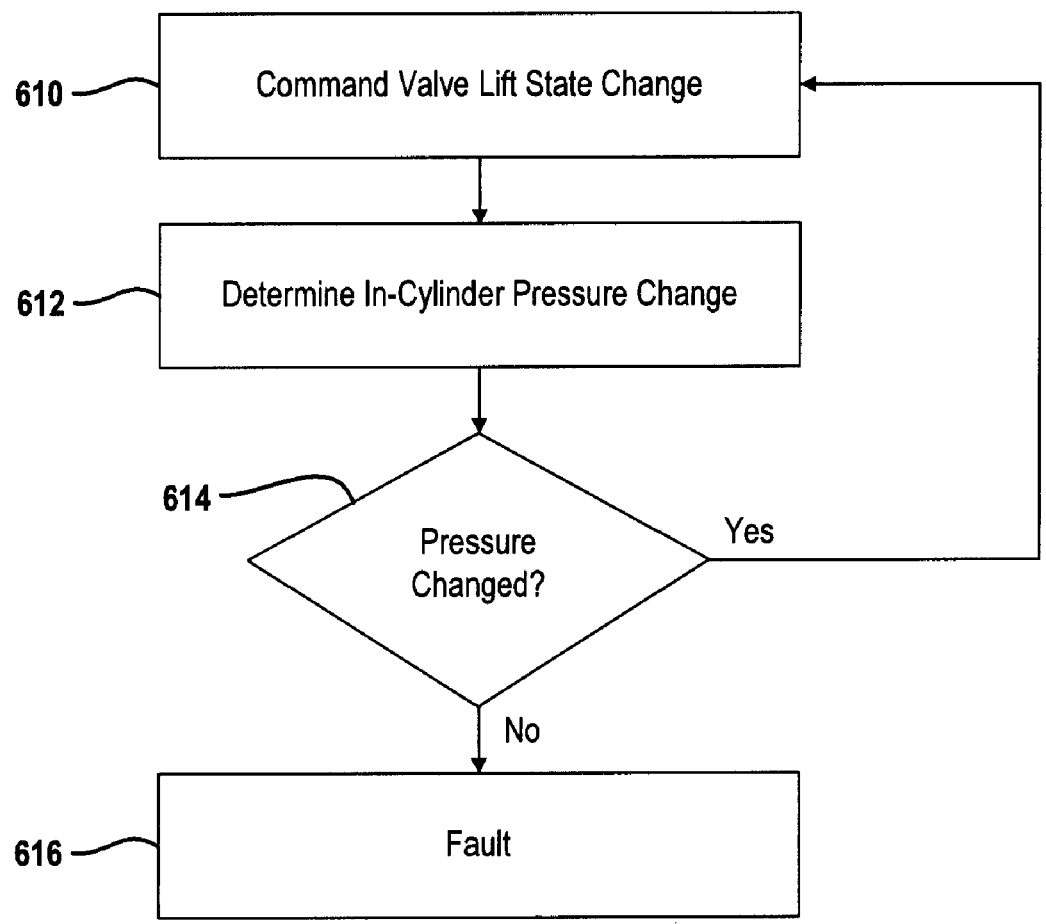
FIG. 6 is flowchart of a method for determining whether a variable valve lift mechanism is operating properly.

Referring now to FIG. 6, a method for determining whether a variable valve lift mechanism is operating is set forth. This process may be provided to comply with regulations for emissions-critical components. The following method may be performed for homogeneous charge compression ignition engines (HCCI). In an HCCI engine, the valves may be closed to allow spontaneous combustion without spark ignition for a portion of the operating range. This is typically a low torque range. In a high torque range, the engine is operated as a spark ignition engine. The following method may be used to force a switch between valve list states while monitoring the cylinder pressures to verify that the valve mechanism is actually moving. If there is no change in the cylinder pressure, the diagnostic will set a trouble code to indicate a fault with the system.

In step 610, the valve list state may be changed using a change between a high lift state and a low lift state or a low lift state and a high lift state may be commanded. The command may be performed during a diagnostic routine or during normal engine operation. In step 612, the in-cylinder pressure is monitored, both before and after the commanded valve lift state change. In step 614, if the pressure has changed, the system is operating properly and step 610 is again performed. If the pressure has not changed, step 616 generates a diagnostic fault signal. It should be noted that the measured pressure may be compared to a threshold or profile that is stored in memory in step 614. Also, the pressure may be compared to a previous pressure that may also act as a threshold. The previous pressure may be from prior to when the valve lift state change was commanded. The diagnostic fault may set a visual indicator, an audible indicator or a trouble code. Various combinations of diagnostic faults may also be generated.

Figure 7:
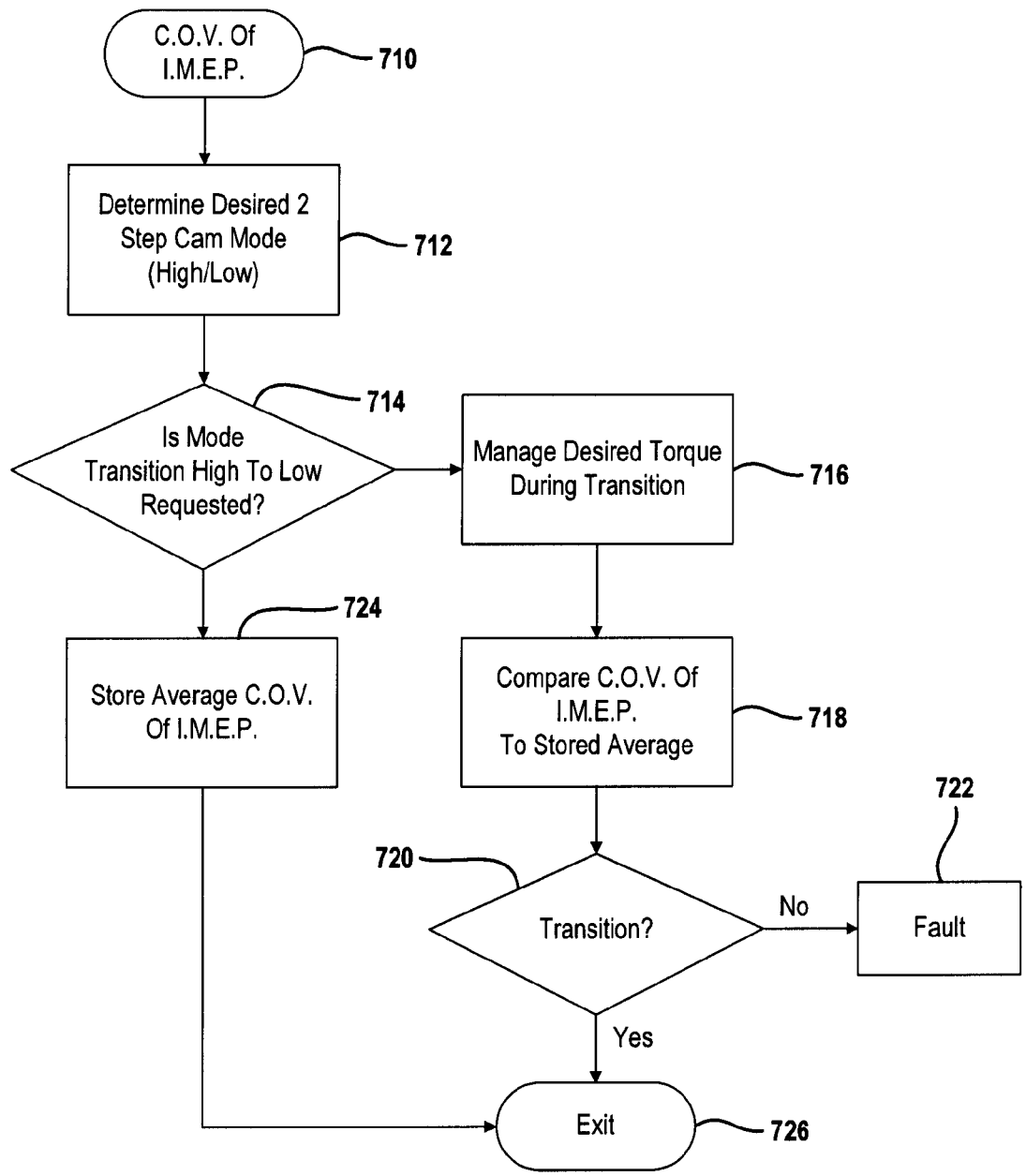
FIG. 7 is a flowchart of a method for determining the proper operation of a crankshaft using a coefficient of variation of the indicated mean-effective pressure.

Referring now to FIG. 7, a method for diagnosing a two-step valve train is set forth. Torque variation at specific engine conditions varies when transitioning from a high lift mode to a low lift mode. Vehicles equipped with combustion feedback systems capable of determining heat release of a cylinder firing event may use variations and change in the variation at the valve transition point to determine if the cam lift has changed states. A coefficient of variation (COV) of the indicated mean effective pressure (IMEP) may be monitored. The coefficient of variation of the indicated mean effective pressure may be derived from the pressure signal for each of the cylinders. In step 712, the desired two-step cam mode is determined. The cam mode may be a high or low cam mode. In step 714, when the cam mode is a transition from a high cam mode to a low cam mode, the torque is managed during the transition in step 716. The coefficient of variation of the indicated mean effective pressure is compared to a stored average of the coefficient of variation of the indicated mean effective pressure in step 718. When the coefficient of variation is compared to the stored average, an indication whether or not a transition has been achieved may be determined in step 720. If no transition takes place, a fault diagnostic indicator is indicated in step 722.

If the mode transition from high to low is not requested in step 714, the average coefficient of variation of the indicated mean effective pressure is stored in step 724. After step 724 and during a transition after step 720 and after step 722, the system exits in step 726.

Figure 8:
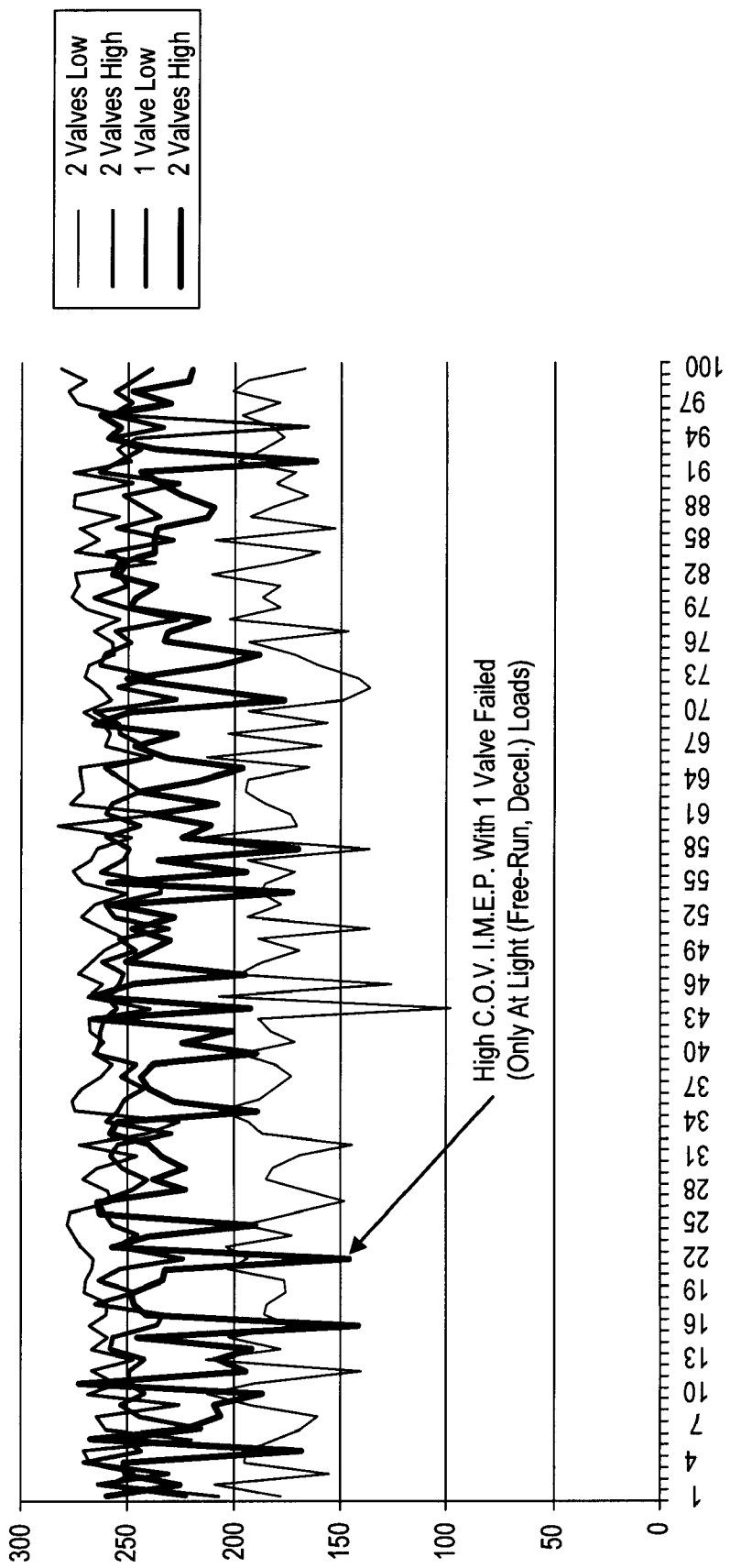
FIG. 8 is a plot of the mean-effective pressure over time.

Referring now to FIG. 8, a plot of IMEP at 3000 rpm's with light load with two-step low lift failures is indicated. As can be seen, when one valve fails, the IMEP crosses the normal two-valve low state in a reduced IMEP direction.

Figure 9:
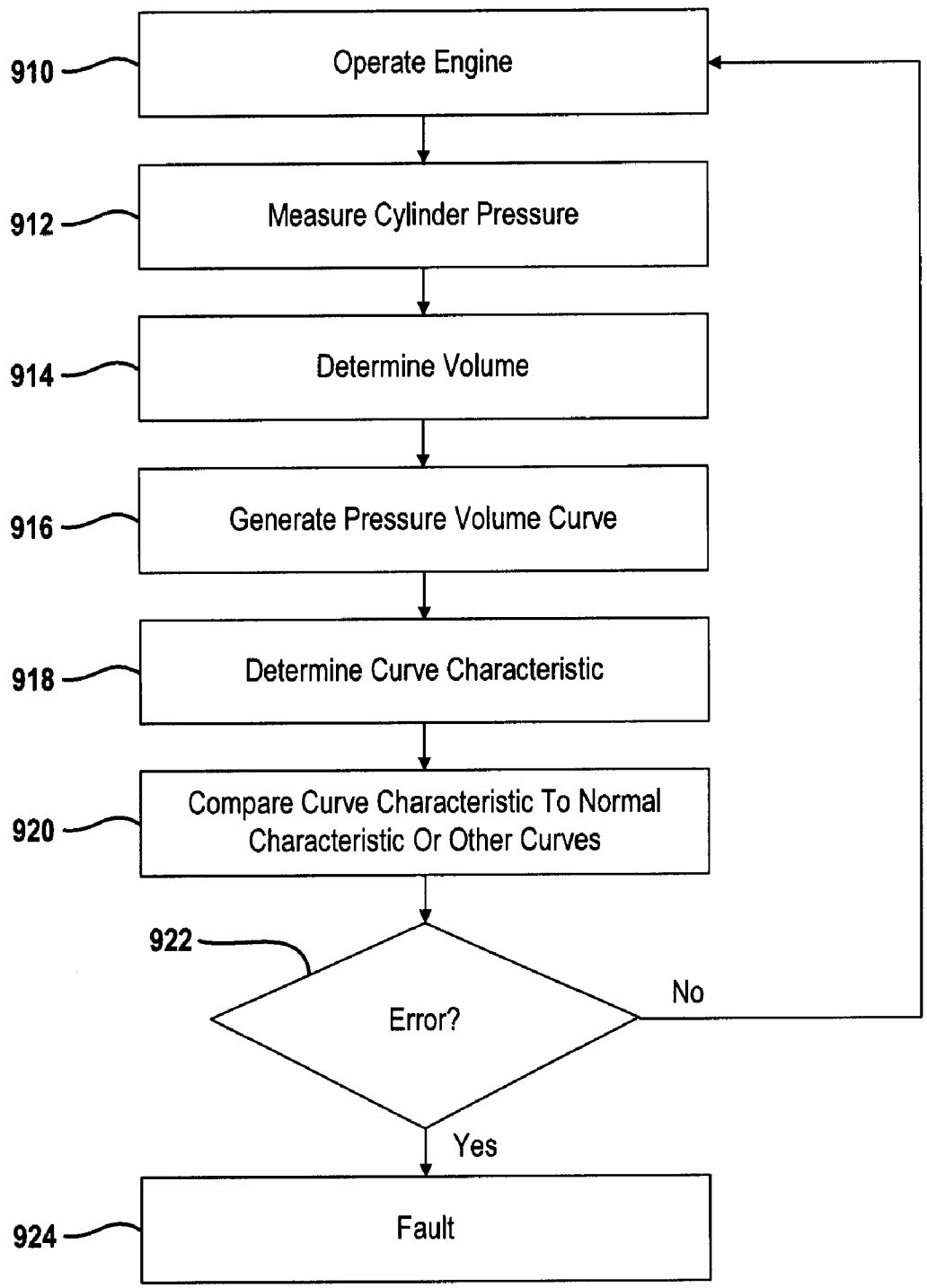
FIG. 9 is a flowchart of a method for determining the proper operation of valves for the engine using pressure-volume curves.

Referring now to FIG. 9, a method for determining failure of a switchable roller finger follower or an oil control valve is set forth. In step 910, the engine is operated. The engine may be operated in a specific state or with a specific set of parameters for this particular diagnosis. The method may also take place under specific operating conditions during regular operation of the engine.

In step 912, the cylinder pressure is determined. In step 914, the volume of the engine is determined. In step 916, a pressure-volume curve is generated over the operation of the cylinder.

In step 918, a pressure-volume curve characteristic may be generated. The pressure-volume curve characteristic may be a slope or an integral of the curve. It should be noted a pressure-volume curve and thus a pressure-volume characteristic may be determined for each of the cylinders. Because the slope of or area under the curve can vary depending upon the lift state, comparing the slopes or integrals of specific portions of the curve of each of the cylinders allow a determination that the valves are operating in the same valve lift state. In step 920, the curve characteristic is compared to a normal characteristic or other curve. The curve characteristic may be determined for each of the cylinders of the engine and each of the curves compared to each other. The curves may also be compared to a threshold.

In step 922, an error may be determined in response to the comparison. If no error is present, the method may again be performed in step 922. If an error is generated, step 924 is performed in which a diagnostic fault is indicated. The error determined in step 922 may correspond to a single switchable roller finger follower or an oil control valve failure. A switchable roller finger follower error may be generated when a single SRFF fails to transition to a specific state when commanded to do so. An oil control valve failure may result when an oil control valve fails to supply enough pressure to transition the switchable roller finger followers in the cylinder(s) associated with the OCV to the high lift state when commanded to do so or an oil control valve which fails to limit pressure to the switchable roller finger followers in the cylinder(s) associated with the OCVs resulting in a failure of a portion of the switchable roller finger follower to transition out of a high lift state even when commanded to do so.

Figure 10:
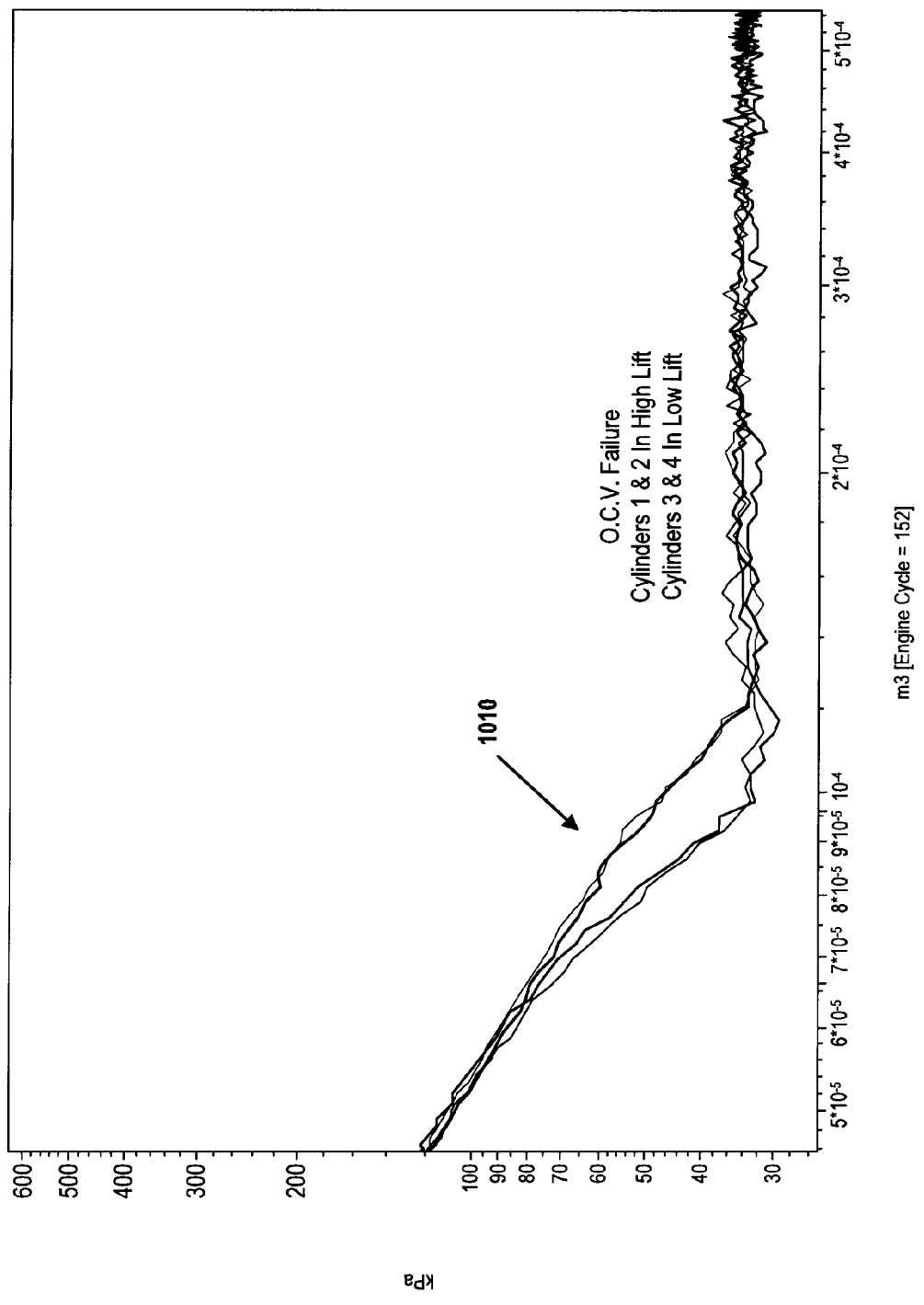
FIG. 10 is a plot of a pressure-volume diagram illustrating oil control valve failure.

Referring now to FIG. 10, a pressure-volume diagram for all four cylinders of a four-cylinder engine is set forth. As can be seen, there is a significant difference in the shape of the pressure traced during the initial portion of the intake stroke. As is illustrated by the arrow 1010, cylinders 1 and 2 are in the high-lift state and cylinders 3 and 4 are in the low-lift state.

Figure 11:
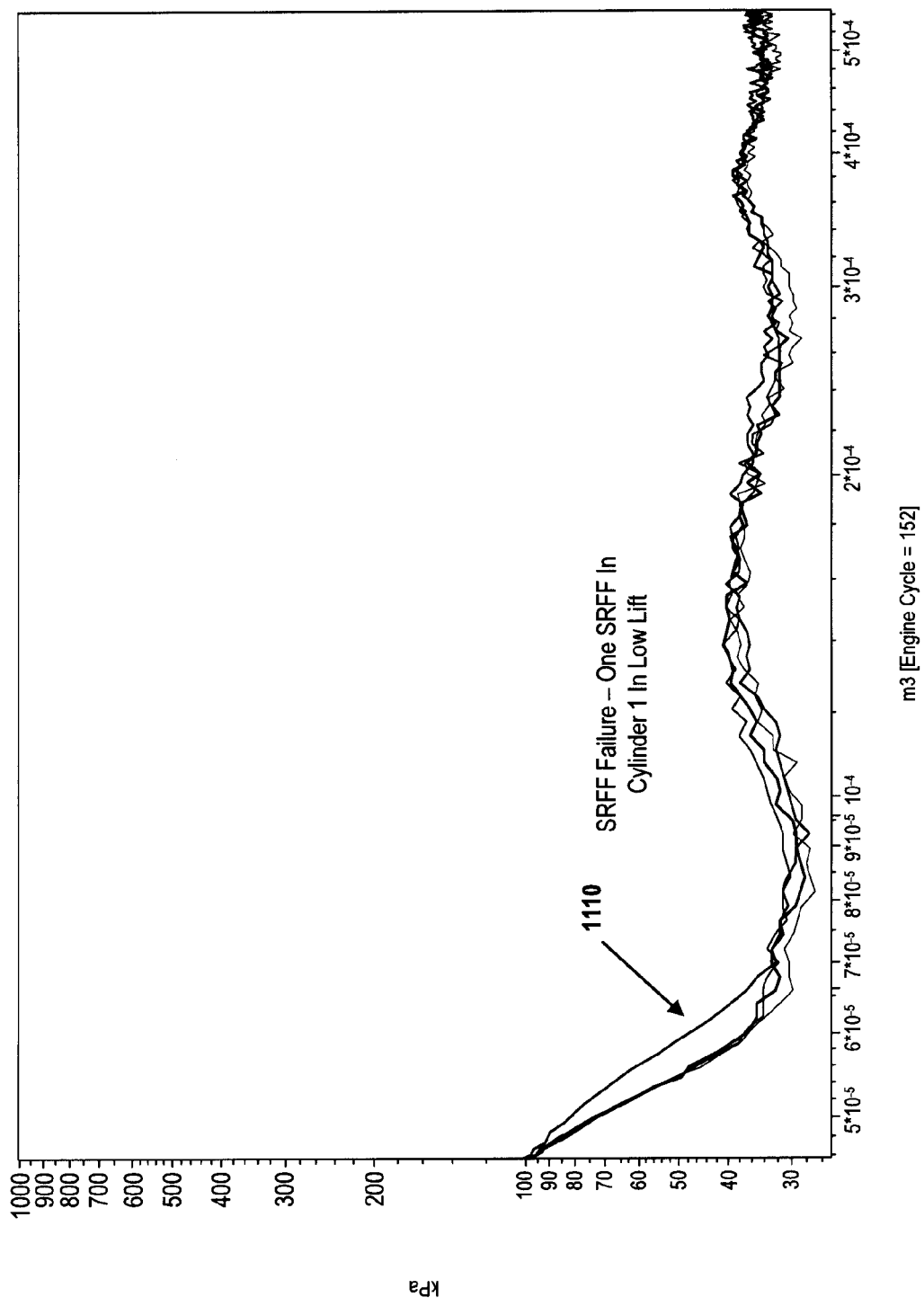
FIG. 11 is a plot of pressure-versus-volume plot of an engine having a switchable roller finger follower failure in low-lift state.

Referring now to FIG. 11, a pressure-volume diagram for a two-step systems failure resulting in one of the eight intake valves being in a low state while all the other intake valves are in the high-lift state. The arrow 1110 shows one SRFF in cylinder 1 in a low-lift state. This corresponds to a switchable roller finger follower failure.

Figure 12:
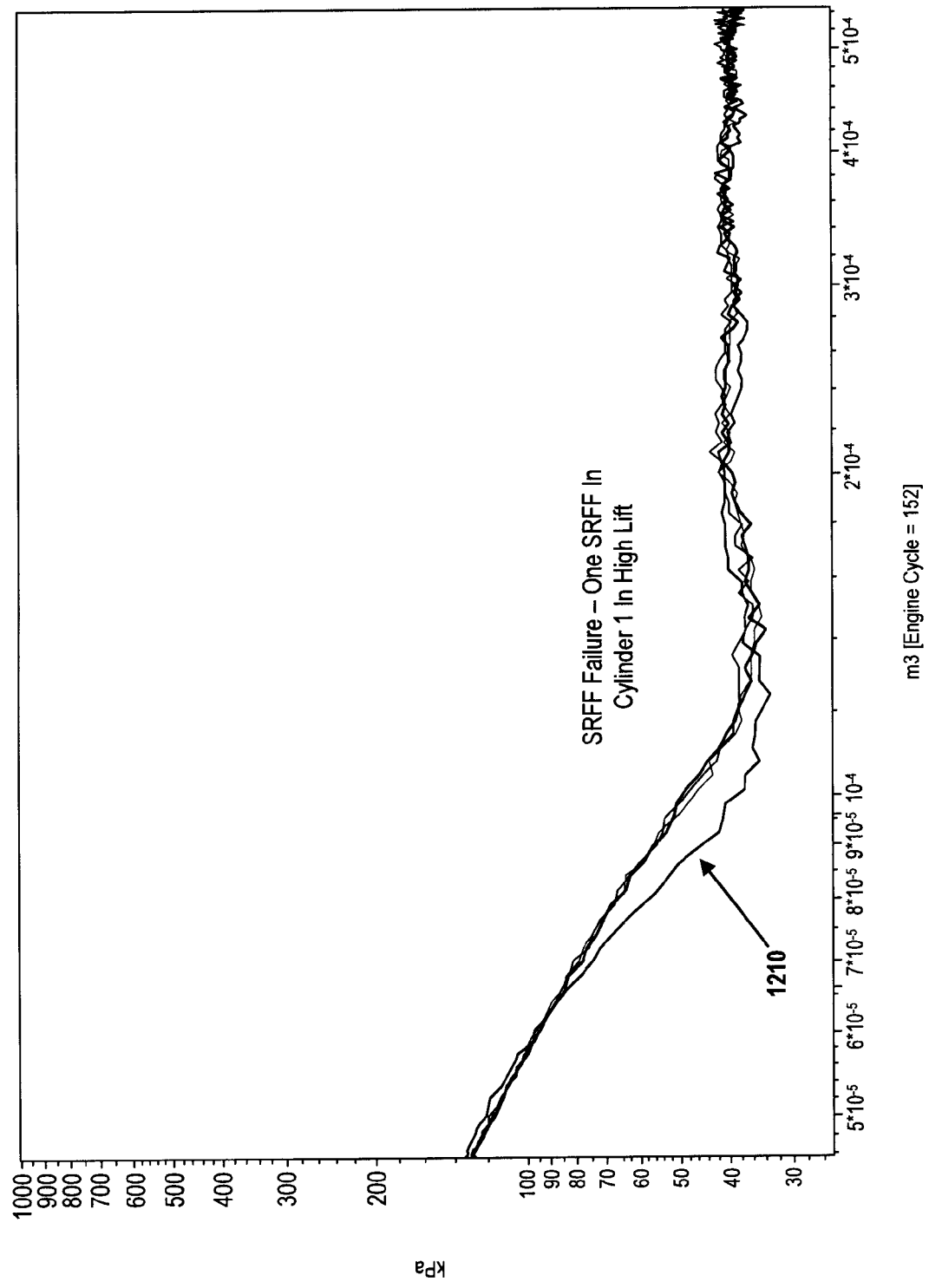
FIG. 12 is a plot of pressure-versus-volume for a switchable roller finger follower in high-lift state.

Referring now to FIG. 12, the converse of FIG. 11 is illustrated. The arrow 1210 illustrates that one SRFF in cylinder 1 is in a high-lift state, while the other SRFF in cylinder 1 and all of the SRFFs in each of the other cylinders are in a low-lift state. As can be seen, the slope of the pressure traced during the initial portion of the pressure-volume diagram may be used to indicate a problem with the particular cylinder valves. If a single cylinder or a pair of cylinders has a significantly different slope, the switchable roller finger follower or the oil control valve, respectively, may be faulty. The integral of the pressure with respect to volume may also be calculated for all cylinders for the portion of the intake stroke or the entire pumping loop. Cylinders having one or both valves in a low-lift state would have reduced calculated value of the integral. The integral of a pressure versus volume plot is defined as work. When one cylinder or a pair of cylinders has significantly different calculated values, a switchable roller finger follower or an oil control valve problem, respectively, may be determined.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
    generating an in-cylinder pressure signal for an engine;
    comparing the in-cylinder pressure signal to a threshold; and
    generating a diagnostic signal for a component of the engine in response to the comparing,
    wherein comparing the in-cylinder pressure signal to the threshold comprises comparing the in-cylinder pressure signal to a profile.

2. A method as recited in claim 1 wherein generating the diagnostic signal for the component of the engine comprises generating the diagnostic signal for a reactivation-deactivation module.

3. A method as recited in claim 1 wherein generating the diagnostic signal for the component of the engine comprises generating the diagnostic signal for a crankshaft position sensor.

4. A method as recited in claim 1 wherein generating the diagnostic signal for the component of the engine comprises generating the diagnostic signal for an oil control valve.

5. A method as recited in claim 1 wherein generating the diagnostic signal for the component of the engine comprises generating the diagnostic signal for a switchable roller finger follower.

6. A method as recited in claim 5 wherein generating the in-cylinder pressure signal comprises generating at least one of a slope and an integral of a pressure-volume curve and wherein the comparing comprises comparing the at least one of the slope and the integral of the pressure-volume curve.

7. A method as recited in claim 1 wherein comparing the in-cylinder pressure signal to the threshold comprises comparing a root mean square error between the in-cylinder pressure signal and a reference pressure signal to the threshold.

8. A method as recited in claim 7 wherein the threshold comprises a reactivation-deactivation threshold.

9. A method as recited in claim 1 wherein generating the in-cylinder pressure signal comprises generating in-cylinder pressure signals for each cylinder of the engine, wherein the engine includes an internal combustion engine.

10. A method comprising:

generating an in-cylinder pressure signal for an engine;

comparing the in-cylinder pressure signal to a threshold; and generating a diagnostic signal for a component of the engine in response to the comparing, wherein generating the diagnostic signal for the component of the engine comprises generating the diagnostic signal for cylinder valves.

11. A method as recited in claim 10 wherein generating the diagnostic signal for the cylinder valves comprises generating the diagnostic signal for the closing of at least one of an intake valve and an exhaust valve.

12. A method as recited in claim 10 wherein generating the diagnostic signal for the cylinder valves comprises generating the diagnostic signal for closing of a valve using a coefficient of variation of a cylinder indicated mean effective pressure (IMEP).

13. A control system comprising:

a comparison module comparing an in-cylinder pressure signal to a threshold, wherein comparing the in-cylinder pressure signal to the threshold comprises comparing the in-cylinder pressure signal to a profile; and a fault indication module generating a diagnostic signal for a component of an engine in response to the comparing.

14. A control system as recited in claim 13 wherein the diagnostic signal comprises a cylinder valve diagnostic signal.

15. A control system as recited in claim 13 wherein the in-cylinder pressure signal corresponds to an indicated mean effective pressure (IMEP).

16. A control system as recited in claim 13 wherein the diagnostic signal comprises a reactivation-deactivation module diagnostic signal.

17. A control system as recited in claim 13 wherein the diagnostic signal comprises a crankshaft position sensor diagnostic signal.

18. A control system as recited in claim 13 wherein the diagnostic signal comprises an oil control valve diagnostic signal.

19. A control system as recited in claim 13 wherein the diagnostic signal comprises a switchable roller finger follower diagnostic signal.

* * * * *